United States Patent Office 3,785,991
Patented Jan. 15, 1974

3,785,991
METHOD OF PREPARING PHOSPHORS FOR
INFRARED-TO-VISIBLE CONVERSION
Akio Toshinai, Chigasaki, and Takashi Hase, Kamakura, Japan, assignors to Dai Nippon Toryo Co., Ltd., Osaka-shi, Japan
Filed Dec. 20, 1971, Ser. No. 209,750
Claims priority, application Japan, Dec. 21, 1970, 45/114,907; June 8, 1971, 46/40,356
Int. Cl. C09k 1/06
U.S. Cl. 252—301.6 R     8 Claims

ABSTRACT OF THE DISCLOSURE

This invention relates to a phosphor for infrared-to-visible conversion comprising as a main ingredient a complex rare earth fluoride having a general composition expressed by the formulae $(Y_{1-x-y}Yb_xA_y)F_3$, $(La_{1-x-y}Yb_xA_y)F_3$ or $(Lu_{1-x-y}Yb_xA_y)F_3$, respectively, wherein $x$ is in the range of from 0.05 to 0.5, $y$ is in the range of from 0.02 to 0.09 when yttrium fluoride is used as the host material, and from 0.001 to 0.1 when lanthanum or lutetium fluoride is used as the host material, and A is at least one member selected from Er and Ho, and zinc incorporated in the complex rare earth fluoride, and a process for the preparation of a zinc-incorporated phosphor for infrared-to-visible conversion, which comprises adding zinc fluoride or zinc silicofluoride prior to or after formation of said complex rare earth fluoride, and subsequent heating.

BACKGROUND OF THE INVENTION (1) Field of the invention

This invention relates to a phosphor which exhibits a visible emission under excitation of infrared radiation, and to a process for the preparation thereof.

(2) Description of the prior art

It has recently been found that some phosphors comprising as a host material a rare earth fluoride such as yttrium fluoride, lanthanum fluoride, and lutetium fluoride as an activator, a rare earth ion such as erbium ($Er^{3+}$) for forming the luminescence center and as a sensitizer an ytteribium ion ($Yb^{3+}$), exhibit a line emission throughout the visible region such as green, red or blue emission due to the trivalent rare earth ion acting as the activator under excitation of infrared radiation from GaAs infrared emitting diodes and the like.

In addition to the above-mentioned yttrium fluoride, lanthanum fluoride and lutetium fluoride, barium yttrium fluoride is known as the host material effective as an element for infrared-to-visible conversion. Phosphors having these fluorides as the host material exhibit considerable luminescence efficiency under excitation of infrared radiation, but because of insufficiency in luminescence brightness, their positive application to various solid state light emitting display devices such as a character display or multicolor display device has been hindered.

Further, processes for the preparation of such phosphors include various difficulties. For instance, it has been known that it is difficult to accomplish the mass production, and reproducibility of the products is poor. One of the causes is that in case the additive to be used for increasing the brightness is, for instance, beryllium fluoride, it has a deliquescence and toxicity for human bodies.

Particularly instructive references are included in the following patent and publication:

(a) U.S. Pat. No. 3,541,018 patented on Nov. 17, 1970—R. A. Hewes: This patent discloses an infrared-excitable ytterbium-sensitized erbium- or thulium-activated rare earth fluoride luminescent material. Although the phosphors of this invention are similar to the luminescent material of the patent with respect to the intended functions, but, the electronic process in solid on the excitation-to-emission mechanism is substantially improved by changing the compositions over the material of said patent, whereby the luminescence efficiency is extremely heightened.

(b) Mat. Res. Bull., vol. 4, p. 777 (1969)—L. G. Van Uitert et al.: This publication teaches that an addition of beryllium fluoride is effective to some extent in the preparation of phosphors. However, because of deliquescence and toxicity of such additive it is impractical for the preparation of phosphors. The product of this invention has no such disadvantage at all, but gives a higher luminescence efficiency.

DETAILED DESCRIPTION OF THE INVENTION

This invention relates to a novel phosphor for infrared-to-visible conversion and to a process for the preparation thereof. More specifically, this invention realtes to the zinc incorporated phosphor for infrared-to-visible conversion comprising as a host material yttrium fluoride, lanthanum fluoride or lutetium fluoride and as a sensitizer ytterbium, and as an activator erbium and/or holmium, whereby the luminescence brightness is extremely heightened.

The primary object of this invention is to provide phosphors for infrared-to-visible conversion having high efficiency and giving high luminescene brightness, which can be effectively applied to optical devices such as display devices.

Another object of this invention is to provide stable and simple processes for the preparation of the phosphors.

Still another object of this invention is to modify substantially the electronic process in solid in the excitation-to-emission mechanism in the phosphor comprising as the host material yttrium fluoride, lanthanum fluoride or lutetium fluoride, as the activator erbium and/or holmium activator erbium and/or holmium by changing the composition thereof and to improve the luminescene efficiency extremely.

We have found that when a specific additive is incorporated in the preparation of phosphors comprising as the host material yttrium fluoride, lanthanum fluoride or lutetium fluoride, as the activator erbium and/or holmium and as the sensitizer ytterbium, the brightness of the resulting products is extremely heightened, and methods per se can be done very easily and with safety and high reproducibility.

More specifically, when the zinc fluoride or zinc silicofluoride is further incorporated as the specific additive into the composition comprising the above-mentioned rare earth fluoride, the brightness of the resulting products is much higher than that of zinc-free phosphors. For instance, in the phosphor containing yttrium fluoride as the host material, the brightness is heightened by 5–10 times due to incorporation of such specific additive, and in the case of the lanthanum fluoride or lutetium fluoride as the host material, the brightness is increased by 2–7 times due to the incorporation. Accordingly, it has now become possible to provide phosphors for infrared-to-visible conversion which are of great practical value.

Figure 2:
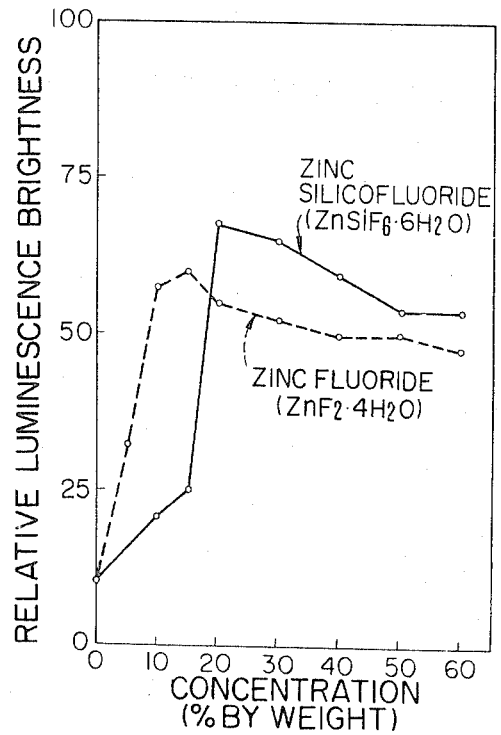
Figure 3:
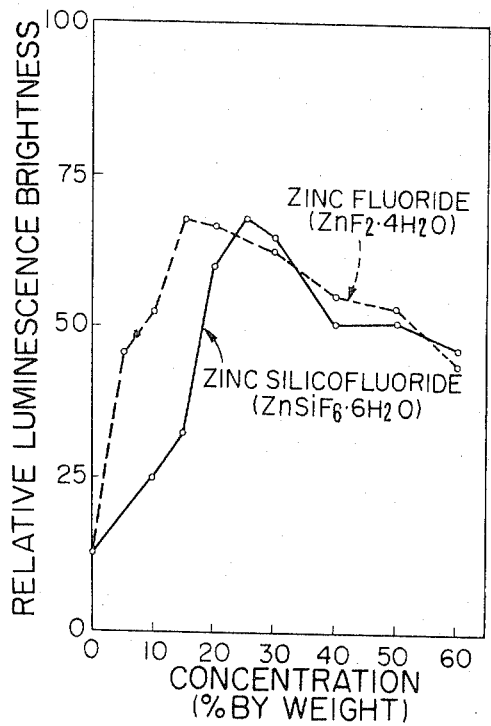
Figure 4:
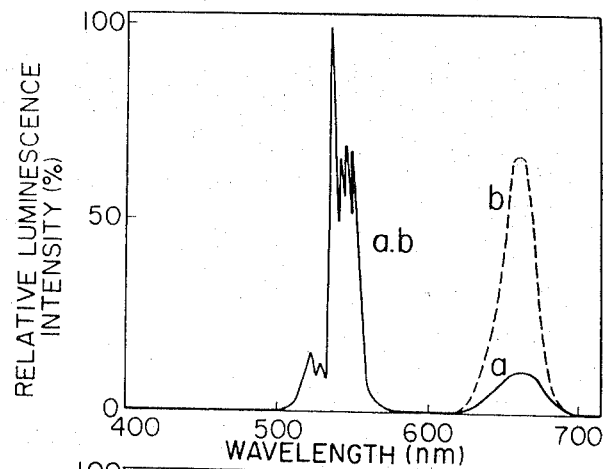
FIGS. 4 to 6 illustrate the effects of this invention in terms of emission spectra under excitation of infrared radiation with respect to the phosphors comprising as the host material yttrium fluoride, lanthanum fluoride or lutetium fluoride. The curve $a$ illustrates the emission spectrum of the phosphor incorporated with zinc according to this invention, and the curve $b$ illustrates the emission spectrum of the phosphor free of zinc, each curve being normalized based on the peak in the green region.
Figure 5:
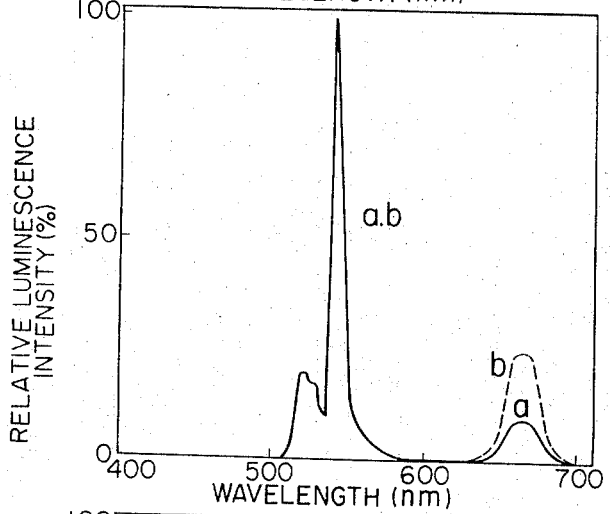
Figure 6:
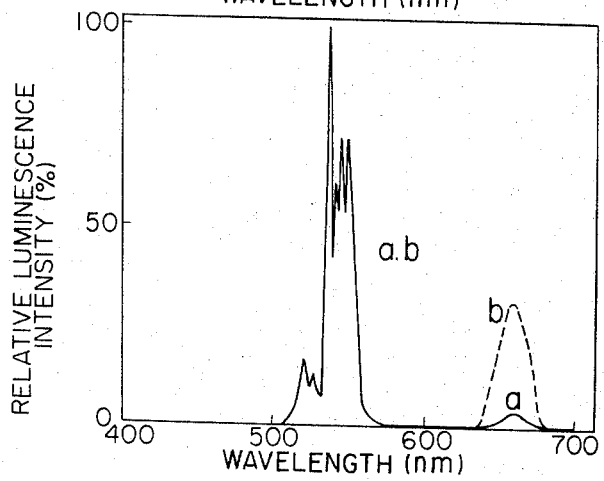

Such conspicuous increase of the brightness by the above additive is shown in FIGS. 1 to 3, and FIGS. 4 to 6, respectively, illustrating the change of the emission spectrum in the phosphor of this invention which is brought about by the incorporation of zinc. As is apparent from comparison of the curve a (phosphor of this invention) with the curve b in each of FIGS. 4 to 6, the luminescene in the red region is extremely lowered but in the green region is heightened in the zinc incorporated phosphor. (FIGS. 4 to 6 are depicted by normalizing the curves based on the maximum peak in the green region, and thus comparison of absolute values may readily be made by referring to FIGS. 1 to 3.)

The reasons for such conspicuous improvement of the luminescence brightness by the above-mentioned two additives have not been completely elucidated, but it is apparent that the first reason resides in an improvement of the luminescence mechanism in that the additives restrain a conversion rate of absorbed infrared lights to the luminescence in the red region which is most disadvantageous as the visibility factor, and increase a conversion rate to the luminescence in the green region which is of the highest luminous efficiency. Incidentally, according to ICI (International Commission on Illumination), the ratio of the luminous efficiency of the green light of 540 nm. to that of the red light of 670 nm. is 0.954 to 0.032.

Further, it is understood that in the phosphors exhibiting infrared-to-visible conversion of this type, the excitation states for luminescence is brought about by excitation processes of two or more stages. Accordingly, it may be understood that, by means of inorporation of zinc, the life time of the first excitation state and of the accompanying intermediate state caused by infrared lights can be made longer and subsequently the probability of the second excitation stage may be heightened, whereby the luminescence efficiency can be improved.

Figure 7A:
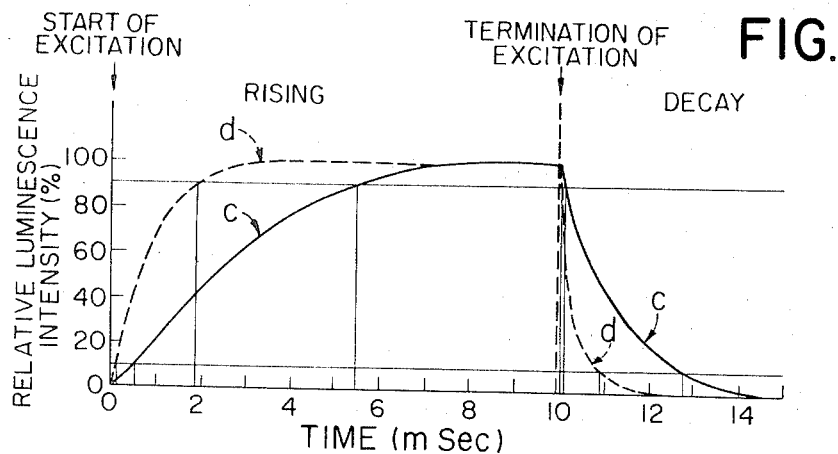
FIGS. 7A, 7B and 7C illustrate the effects of this invention in terms of the time response characteristics under excitation of pulse-like infrared radiation with respect to the phosphors comprising as the host material yttrium fluoride, lanthanum fluoride or lutetium fluoride. The curve $c$ illustrates the response of the phosphor incorporated with zinc according to this invention, and the curve $d$ illustrates the response of the phosphor free of zinc, each curve being normalized based on the saturation value of each luminescence brightness.
Figure 7B:
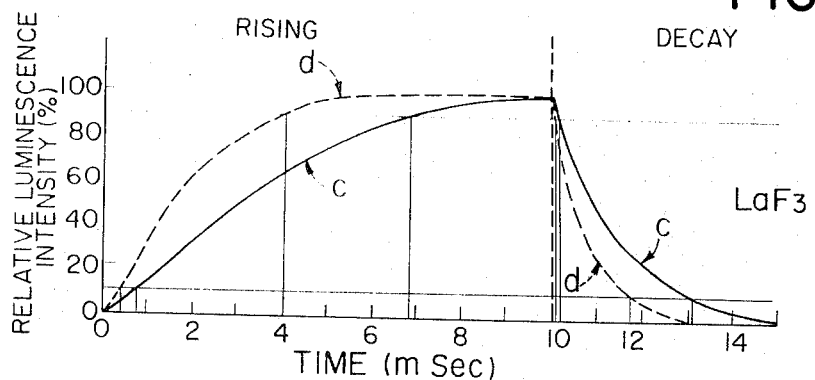
Figure 7C:
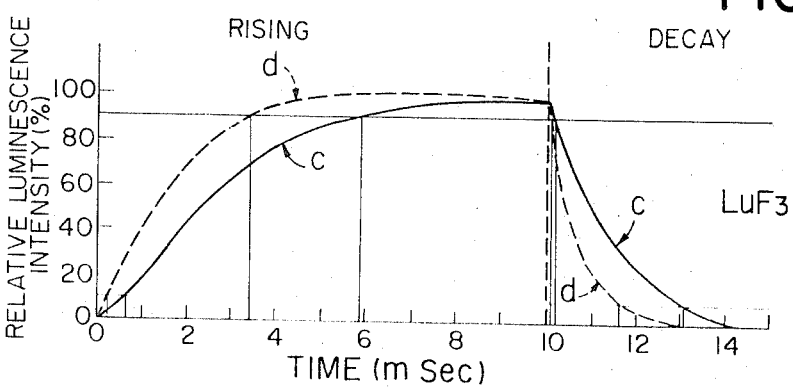

FIGS. 7A, 7B and 7C showing the time response characteristics support the above understanding. More specifically, as is apparent from a comparison of the curve c (the phosphor of the present invention) with the curve d, retardation of the rising and the decay time is understood corresponding to the above-mentioned increase of the life time during the excitation process.

The above prominent differences seen in the emission spectra and the time response characteristics prove that the phosphors of this invention are novel phosphors which can be distinguished substantailly from known rare earth fluoride phosphors of a similar composition except for zinc with respect to the excitation-to-emission mechanism.

The second reason is presumed to be that incorporation of zinc improves the particle property of phosphor crystals so that, when the phosphor of this invention is excited by infrared lights, scattering of incident infrared lights may be prevented, whereby they may be absorbed efficiently.

The third reason is construed to be that the specific additives of this invention, like ordinary additives called "fluxes," perform the functions of stabilizing a preparation of the phosphors and removing and extracting unnecessary impurities by substitution or the like.

Figure 1:
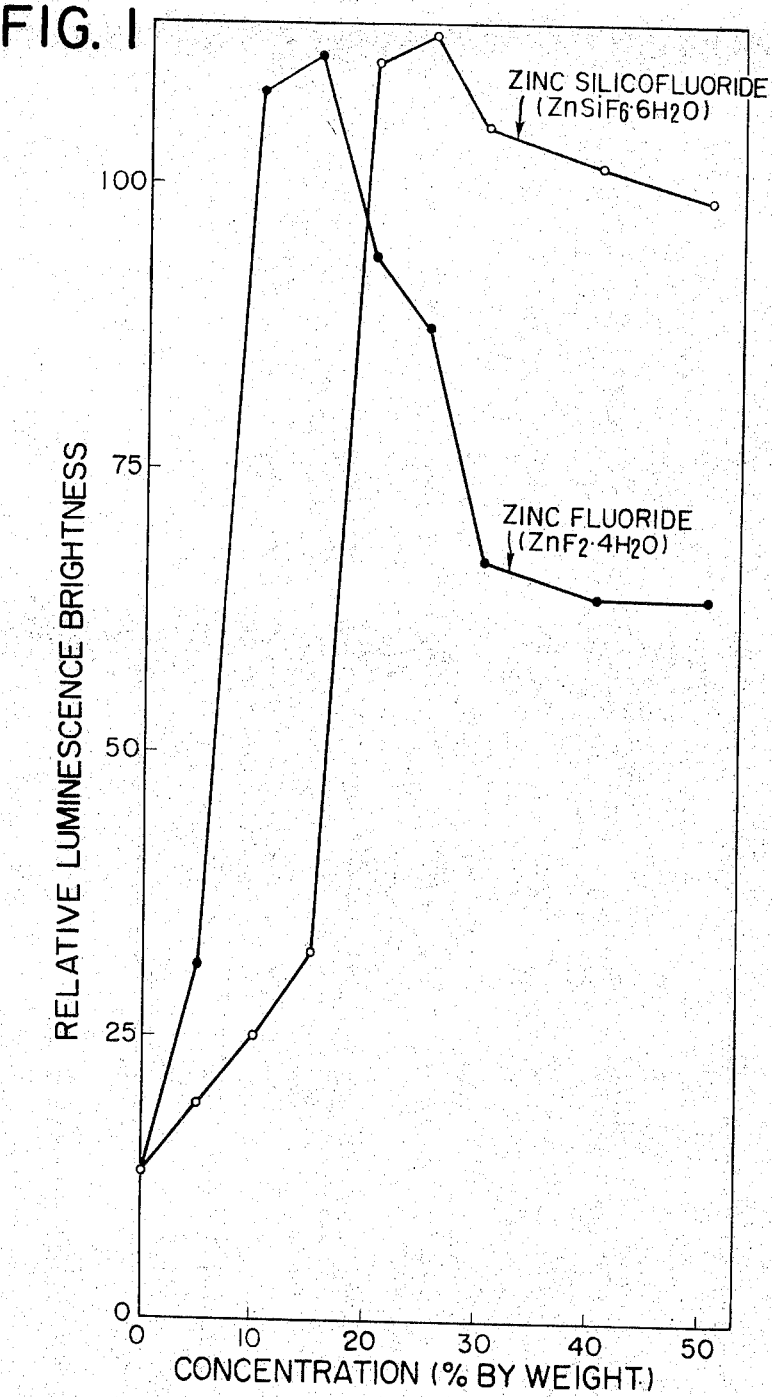
FIGS. 1 to 3 illustrate the relation between the luminescence brightness under excitation of infrared radiation and the amount of zinc fluoride or zinc silicofluoride in the phosphors for infrared-to-visible conversion comprising as the host material yttrium fluoride, lanthanum fluoride or lutetium fluoride.

Since the improvement in the brightness shown in FIGS. 1 to 3 is so conspicuous as not seen in conventional phosphors, it is deemed that not only the above-mentioned effects on the luminescence mechanism but also various complex synergistic effects contribute in the attainment of such unexpected phenomena. In short, the effects by incorporation of zinc in accordance with this invention are unexpected and unobvious over the effects by conventional fluxes and other additives customarily used in the preparation of phosphors.

Zinc fluoride, which is one of the specific additives discovered by us, makes it possible to sweep away a fear of toxicity against human bodies inevitably involved in the addition of a beryllium compound for the preparation of the phosphors.

Further, zinc fluoride is not deliquescent and takes the form of finely divided crystals. Thus, it has an advantage of easy handling. Also, zinc silicofluoride is free of deliquescence and takes the form of stable granulated crystals. Therefore, it can be handled as readily as zinc fluoride. Phosphors obtained by employing these additives exhibit under excitation of infrared radiation a much higher luminescence brightness than the conventional phosphors obtained by addition of beryllium fluoride.

Further, the additives to be used in this invention are much cheaper than beryllium fluoride conventionally used in the art, and therefore, with use of the additives of this invention the manufacturing cost of phosphors for infrared-to-visible conversion can be greatly reduced.

The phosphors of this invention may be synthesized, for instance, by the following methods.

Yttrium fluoride, lanthanum fluoride and lutetium fluoride to be used as the host materials may be formed conveniently by utilizing the reaction in solutions.

More specifically, an aqueous solution of a water-soluble compound of yttrium, lanthanum or lutetium, or an acid or alkali solution of a compound of yttrium, lanthanum or lutetium is heated on a water bath, and excess of a hydrofluoric acid solution is poured thereinto, or a hydrogen fluoride gas is blown into such aqueous, acid or alkali solution, whereby precipitates of yttrium fluoride, lanthanum fluoride or lutetium fluoride are formed. Then, the precipitate is recovered in the hydrous form of yttrium fluoride, lanthanum fluoride or lutetium fluoride by suction filtration of the precipitate or evaporation of the solution. Then, such hydrous fluoride is heated at a relatively low temperature such as about 300° C. in vacuum or in a neutral atmosphere so as to obtain the anhydrous form of yttrium fluoride, lanthanum fluoride or lutetium fluoride, which can be used as the host material.

In this invention, it is essential to incorporate into the above host material rare earth fluorides such as ytterbium fluoride and erbium fluoride which may be prepared in the same manner as the above host material, and at least one member selected from zinc fluoride and zinc silicofluoride.

As the method for incorporating the rare earth fluorides as activator or sensitizer in desired amounts into the host material of yttrium fluoride, lanthanum fluoride or lutetium fluoride, there have been known the following two methods.

One of them comprises adding necessary amounts of rare earth fluorides prepared in the same manner as mentioned with respect to yttrium fluoride, lanthanum fluoride and lutetium fluoride, to the host material fluoride, and mixing them mechanically.

The other method comprises utilizing similarility of chemical properties between these additive fluorides and the host material fluoride, namely coprecipitating rare earth fluorides to be used as additives, with yttrium fluoride, lanthanum fluoride or lutetium fluoride to be used as the host material.

The former method attains the incorporation merely by the physical or mechanical blending of rare earth fluorides, and therefore, in this method it is necessary to conduct milling and mixing sufficiently.

In the latter method, they are uniformly blended and do not require any additional operation for blending, since there occurs a coprecipitation of rare earth fluorides with the host material.

Either of these known blending methods may be adopted in the preparation of phosphors of this invention.

In short, the zinc compounds may be incorporated into a mixture of rare earth fluorides or into a coprecipitated mixture of rare earth fluorides. For instance, the zinc compounds can be sufficiently blended with rare earth fluorides by means of a mixing means such as a mortar or a ball mill, and thus a pulverization of the starting mixture can be attained in the same time.

It is also possible to adopt a method comprising subjecting a mixture of rare earth fluorides free of zinc to the heat treatment which will be described below, and then adding the zinc compound into the heat-treated mixture, whereby blending them sufficiently.

In this invention ytterbium, and erbium and/or holmium are added to yttrium fluoride, lanthanum fluoride or lutetium fluoride in such amounts that the resulting phosphor will have a main composition expressed by one of the following formulas:

$$(Y_{1-x-y}Yb_xA_y)F_3$$

$$(La_{1-x-y}Yb_xA_y)F_3$$

and $$(Lu_{1-x-y}Yb_xA_y)F_3$$

wherein A is at least one member selected from erbium and holmium.

The amount $x$ of ytterbium is, expressed in the gram atomic ratio, from 0.05 to 0.5.

The amount $y$ of erbium and/or holmium is, expressed in the gram atomic ratio, from 0.002 to 0.09 when yttrium fluoride is used as the host material, and from 0.001 to 0.1 when lanthanum or lutetium fluoride is used as the host material.

When the amounts of ytterbium, and erbium and/or holmium are within the above ranges, there can be obtained the phosphors having high efficiency of infrared-to-visible conversion and high luminescence brightness. Best results are obtained when the value of $x$ is within a range of from 0.1 to 0.3, and the value of $y$ is within a range of from 0.01 to 0.04.

The amounts of zinc fluoride or silicofluoride will now be described. In the case of zinc fluoride, good results are obtained when it is incorporated in an amount of at least 2% by weight based on the total weight of the rare earth fluorides expressed by the above general formula, and the amount ranging from 10 to 15% by weight is preferably recommended.

In the case of zinc silicofluoride, good results are obtained when it is incorporated in an amount of at least 10% by weight based on the total weight of rare earth fluorides expressed by the above formula and, the amount ranging from 20 to 30% by weight is preferable.

The starting mixture is sufficiently and uniformly blended, and then it is subjected to heat treatment. In this heat treatment, the staring mixure is charged ino a heat-resistant, lidded vessel such as an alumina crucible or a platinum crucible, and is heated in a neutral atmosphere such as nitrogen or argon or in an atmosphere of anhydrous hydrogen fluoride.

The heating temperature is within a range of from 800 to 1200° C. in the case of lanthanum fluoride, and within a range of from 800 to 1100° C. in the case of yttrium fluoride or lutetium fluoride.

It is appropriate to conduct the heating for 30 minutes to 5 hours. It is preferred to carry out the heat treatment for 1-3 hours at about 1050° C. in the case of the former host material and at about 1000° C. in the case of the latter host material.

Better results are obtained when the gradual cooling is conducted after completion of the above heat treatment.

The luminescence brightness can be further improved by slightly pulverizing the resulting phosphors and washing them with an acid such as nitric acid or hydrochloric acid.

In some cases, the growth of particles and improvement of the luminescence brightness can be attained by adding to the washed product the zinc compounds or other well-known flux in a similar manner which is described above, and further repeating the heat treatment.

Alternatively, excellent phosphors for infrared-to-visible conversion can be obtained from known phosphors having a similar composition but free of zinc. More specifically, a known phosphor for infrared-to-visible conversion being free of zinc is used as the starting material, and zinc fluoride and/or zinc silicofluoride is incorporated thereinto according to this invention, followed by such heating and preparation procedures as described above.

As is well known, the phosphors have quite a high structure-sensitiveness. The effects of the specific additives discovered by us are attained by utilizing most effectively this high structure-sensitiveness. Accordingly, in the preparation of the phosphors according to this invention, care must be taken for conducting the above operational procedures under the abovementioned conditions.

The present invention has been given hereinbefore by referring mainly to the case where erbium is used as the activator, but it must be noted that the above explanation can apply similarly to the case where holmium is used as the activator.

In some cases, the phosphors obtained by the abovementioned process of this invention cannot be distinguished by X-ray diffraction from analogous well-known phosphors, but the presence of zinc corresponding to the amount of zinc fluoride or zinc silico-fluoride can be confirmed in the phosphors by a spectroscopic analyzer or an electron probe microanalyzer. Further, as is seen from FIGS. 4 to 7, the incorporation of zinc results in reduction of the red emission under excitation of infrared radiation and in an increase of the green emission.

It is also evident that the time response is greatly retarded by the incorporation of zinc. Thus, the prominent effects of this invention can be proved by data shown in these figures.

The effects of this invention are summarized as follows:

(1) The additive is free of toxicity for the human body.

(2) The additives are not deliquescent at all, and their handling is quite easy during the preparation of phosphors.

(3) The additives exhibit various synergistic effects such as the effect of stabilizing the growth of crystals and the effect of increasing the energy conversion efficiency to the green emission.

(4) It is possible to provide the novel phosphors for infrared-to-visible conversion comprising as the host material yttrium fluoride, lanthanum fluoride or lutetium fluoride, which has a luminescence brightness sufficiently high for practical use, as compared with conventional products.

This invention will now be described in detail by the following examples. Most recommendable methods for the synthesis of phosphors of this invention are illustrated in Examples 1 and 9.

EXAMPLE 1

A mixture of the following rare earth oxides:

| | Mole |
|---|---|
| Yttrium oxide ($Y_2O_3$) | 0.79 |
| Ytterbium oxide ($Yb_2O_3$) | 0.19 |
| Erbium oxide ($Er_2O_3$) | 0.02 | was dissolved in nitric acid in an amount slightly exceeding the stoichiometric amount, and pure water was added to the solution until the volume of the resulting aqueous solution was about 2 times as large as that of the starting nitric acid solution. Excess hydrofluoric acid was poured into the aqueous solution and the solution was heated with stirring for about 3 hours to form a gelatinous coprecipitate mixture of rare earth fluorides in the solution. The coprecipitated-mixture containing solution was allowed to stand still overnight, and the mixture of hydrous rare earth fluorides was separated by suction filtration and dried in a drier to remove absorbed water. Then, the dried coprecipitated mixture was heated at about 300° C. for about 1 hour in a nitrogen atmosphere to remove water of crystallization therefrom. To the thus obtained mixture of anhydrous rare earth fluorides, 0.28 mole of zinc fluoride ($ZnF_2 \cdot 4H_2O$) was added and they were well blended by employing a mortar. Then, the blend was charged into an alumina crucible and was heated at 1000° C. for 2 hours in high purity nitrogen atmosphere in an electric furnace. Thus there was obtained a phosphor for infrared-to-visible conversion which emitted at a high efficiency under excitation of infrared radiation and exhibited the emission spectrum shown in curve $a$ of FIG. 4.

EXAMPLE 2

To the anhydrous rare earth fluoride mixture obtained in the same manner as in Example 1, 0.26 mole of zinc silicofluoride ($ZnSiF_6 \cdot 6H_2O$) was added, and they were well blended by employing a mixer mill and charged into an alumina crucible. Then, the blend was heated at 1000° C. for 1.5 hours in a current of nitrogen in an electric furnace to obtain a phosphor for infrared-to-visible conversion which emitted at a high efficiency under excitation of infrared radiation and exhibited the emission spectrum shown in curve $a$ of FIG. 4.

EXAMPLE 3

Anhydrous rare earth fluorides formed by optional known methods were blended to obtain the following mixture:

| | Mole |
|---|---|
| Yttrium fluoride ($YF_3$) | 0.79 |
| Ytterbium fluoride ($YbF_3$) | 0.19 |
| Erbium fluoride ($ErF_3$) | 0.03 |

Then, 0.14 mole of zinc fluoride ($ZnF_2 \cdot 4H_2O$) was added to the mixture and sufficiently milled and mixed by means of a ball mill. The mixture was charged into an alumina crucible and heated at 1000° C. for 2 hours in a current of nitrogen in an electric furnace. Thus there was obtained a phosphor for infrared-to-visible conversion which emitted at a high efficiency under excitation of infrared radiation and exhibited the emission spectrum shown in curve $a$ of FIG. 4.

EXAMPLE 4

Anhydrous rare earth fluorides prepared by optional known processes were blended to form the following mixture:

| | Mole |
|---|---|
| Yttrium fluoride ($YF_3$) | 0.79 |
| Ytterbium fluoride ($YbF_3$) | 0.19 |
| Erbium fluoride ($ErF_3$) | 0.02 |

Then, 0.13 mole of zinc silicofluoride ($ZnSiF_6 \cdot 6H_2O$) was added to the mixture and sufficiently blended thereinto by employing a mixer mill. The resulting blend was charged into an alumina crucible and heated at 1000° C. for 2.5 hours in a high purity nitrogen atmosphere in an electric furnace. Thus, there was obtained a phosphor for infrared-to-visible conversion which emitted at a high efficiency under excitation of infrared radiation and exhibited the emission spectrum shown in curve $a$ of FIG. 4.

EXAMPLE 5

To one mole of a mixture of anhydrous rare earth fluorides obtained by optional known methods, having a composition $(Y_{0.79} \cdot Yb_{0.19} \cdot Er_{0.02})F_3$ 0.15 mole of zinc fluoride ($ZnF_2 \cdot 4H_2O$) was added, and they were well blended by employing a ball mill. The blend was charged into a platinum crucible and heated at 1050° C. for 2 hours in a high purity nitrogen atmosphere in an electric furnace to obtain a phosphor for infrared-to-visible conversion which emitted at a high efficiency and exhibited the emission spectrum shown in curve $a$ of FIG. 4.

EXAMPLE 6

Anhydrous rare earth fluorides obtained by optional known methods were mixed to form the following mixture:

| | Mole |
|---|---|
| Yttrium fluoride ($YF_3$) | 0.79 |
| Ytterbium fluoride ($YbF_3$) | 0.19 |
| Erbium fluoride ($ErF_3$) | 0.02 | and further 0.12 mole of zinc fluoride ($ZnF_2 \cdot 4H_2O$) were added to the mixture. The mixture was well blended by means of a mortar and charged into a platinum crucible, and then heated at 950° C. for 2 hours in a current of hydrogen fluoride in an electric furnace. Thus there was obtained a phosphor for infrared-to-visible conversion which emitted at a high efficiency under excitation of infrared radiation and exhibited the emission spectrum shown in curve $a$ of FIG. 4.

EXAMPLE 7

To one mole of a mixture of rare earth fluorides prepared by optional known methods, having a composition $(Y_{0.80} \cdot Yb_{0.185} \cdot Er_{0.015})F_3$ 0.15 mole of zinc silico-fluoride ($ZnSiF_6 \cdot 6H_2O$), was added and they were well blended by means of a mortar, charged into a platinum crucible and heated at 950° C. for 2 hours in a current of argon in an electric furnace to obtain a phosphor for infrared-to-visible conversion which emitted at a high efficiency under excitation of infrared radiation and exhibited the emission spectrum shown in curve $\alpha$ of FIG. 4.

EXAMPLE 8

Anhydrous rare earth fluorides prepared by optional known methods were mixed to form the following mixture:

| | Mole |
|---|---|
| Yttrium fluoride ($YF_3$) | 0.795 |
| Ytterbium fluoride ($YbF_3$) | 0.19 |
| Holmium fluoride ($HoF_3$) | 0.015 | and further 0.12 mole of zinc fluoride ($ZnF_2 \cdot 4H_2O$) were added to the mixture. They were well blended by means of a ball mill, charged into an alumina crucible, and heated at 1000° C. in a current of pure nitrogen for 2 hours in an electric furnace to obtain a phosphor for infrared-to-visible conversion which emitted at a high efficiency under excitation of infrared radiation and exhibited the emission spectrum shown in curve $\alpha$ of FIG. 4.

EXAMPLE 9

A mixture of the following rare earth oxides:

| | Mole |
|---|---|
| Lanthanum oxide ($La_2O_3$) | 0.85 |
| Ytterbium oxide ($Yb_2O_3$) | 0.14 |
| Erbium oxide ($Er_2O_3$) | 0.03 | was dissolved in nitric acid in an amount slightly exceeding the stoichiometric amount, and pure water was added to the solution until the volume of the resulting aqueous solution was about 2 times as large as that of the starting nitric acid solution. Excess hydrofluoric acid was poured into the aqueous solution and the solution was heated with stirring for about 3 hours to obtain a gelatinous coprecipitated mixture of rare earth fluorides in the solution. The coprecipitated mixture-containing solution was allowed to stand still overnight, and hydrous rare earth fluoride hydrates were separated by suction filtration and dried at about 300° C. for about 1 hour in a nitrogen atmosphere to remove absorbed water therefrom. Then, to the resulting mixture of anhydrous rare earth fluorides 0.28 mole of zinc fluoride (ZnF$_2$·4H$_2$O) was added and well blended therewith by employing a mortar. The blend was charged into an alumina crucible and heated at 1050° C. for 2 hours in a high purity nitrogen atmosphere, followed by washing with the same amount of nitric acid as that of the product. Thus there was obtained a phosphor for infrared-to-visible conversion which emitted at a high efficiency under excitation of infrared radiation and exhibited the emission spectrum shown in the curve $a$ of FIG. 5.

EXAMPLE 10

To one mole of a mixture of anhydrous rare earth fluorides prepared in the same manner as in Example 9 0.26 mole of zinc silicofluoride (ZnSiF$_6$·6H$_2$O) was added, and they were well mixed by employing a mixer mill. The resulting blend was charged in an alumina crucible and heated at 1050° C. for 1.5 hours in a current of nitrogen in an electric furnace. Thus there was obtained a phosphor for infrared-to-visible conversion which emitted at a high efficiency under excitation of infrared radiation and exhibited the emission spectrum shown in curve $a$ of FIG. 5.

EXAMPLE 11

Anhydrous rare earth fluorides prepared by an optional known method or the above-described method were blended to form the following mixture:

| | Mole |
|---|---|
| Lanthanum fluoride (LaF$_3$) | 0.86 |
| Ytterbium fluoride (YbF$_3$) | 0.12 |
| Erbium fluoride (ErF$_3$) | 0.02 | and further 0.14 mole of anhydrous zinc fluoride (ZnF$_2$) was added to the mixture. The mixture was well blended by means of a ball mill, charged into an alumina crucible and heated at 1050° C. for 2 hours in a current of nitrogen in an electric furnace. Thus there was obtained a phosphor for infrared-to-visible conversion which emitted at a high efficiency under excitation of infrared radiation and exhibited the emission spectrum shown in curve $a$ of FIG. 5.

EXAMPLE 12

Anhydrous rare earth fluorides prepared by an optional known method or the above-mentioned method were blended to form the following mixture:

| | Mole |
|---|---|
| Lanthanum fluoride (LaF$_3$) | 0.86 |
| Ytterbium fluoride (YbF$_3$) | 0.12 |
| Erbium fluoride (ErF$_3$) | 0.02 | and further 0.26 mole of zinc silicofluoride (ZnSiF$_6$·6H$_2$O)

were added to the mixture. The resulting mixture was well blended by means of a mixer mill, charged into a platinum crucible and heated at 1000° C. for 2.5 hours in an anhydrous hydrogen fluoride atmosphere in an electric furnace to obtain a phosphor for infrared-to-visible conversion which emitted at a high efficiency under excitation of infrared radiation and exhibited the emission spectrum shown in curve $a$ of FIG. 5.

EXAMPLE 13

Anhydrous rare earth fluorides obtained by an optional known method or the above-mentioned method were blended to form the following mixure:

| | Mole |
|---|---|
| Lanthanum fluoride (LaF$_3$) | 0.86 |
| Ytterbium fluoride (YbF$_3$) | 0.12 |
| Holmium fluoride (HoF$_3$) | 0.02 | and further 0.14 mole of zinc fluoride (ZnF$_2$·4H$_2$O) was added to the mixture. The resulting mixture was well blended by employing a ball mill, charged into an alumina crucible and heated at 1000° C. for 2 hours in a current of pure nitrogen in an electric furnace to obtain a phosphor for infrared-to-visible conversion exhibiting a green emission of a high brightness under excitation of infrared radiation.

EXAMPLE 14

Anhydrous rare earth fluorides prepared by an optional known method or the above-mentioned method were blended to form the following mixture:

| | Mole |
|---|---|
| Lutetium fluoride (LuF$_3$) | 0.79 |
| Ytterbium fluoride (YbF$_3$) | 0.19 |
| Erbium fluoride (ErF$_3$) | 0.02 | and further 0.14 mole of zinc fluoride (ZnF$_2$·4H$_2$O) were added to the mixture. The resulting mixture was well blended by means of a ball mill, charged into an alumina crucible and heated at 1000° C. for 2 hours in a current of pure argon in an electric furnace to obtain a phosphor for infrared-to-visible conversion which emitted at a high efficiency under excitation of infrared radiation and exhibited the emission spectrum shown in curve $a$ of FIG. 6.

EXAMPLE 15

To one mole of anhydrous complex rare earths fluorides obtained by an optional known method or the above-mentioned method, having a composition

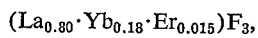
$(La_{0.80} \cdot Yb_{0.18} \cdot Er_{0.015})F_3$, 0.26 mole of zinc silicofluoride (ZnSiF$_6$·6H$_2$O) was added, and they were well blended by employing a mortar. The resulting mixture was charged into an alumina crucible and heated at 1000° C. for 2 hours in a current of pure nitrogen in an electric furnace, followed by addition of nitric acid of the same amount as that of the product. Thus there was obtained a phosphor for infrared-to-visible conversion which emitted at a high efficiency under excitation of infrared radiation and exhibited the emission spectrum shown in curve $a$ of FIG. 5.

EXAMPLE 16

Anhydrous rare earth fluorides prepared by an optional known method or the above-mentioned method were blended to form the following mixture:

| | Mole |
|---|---|
| Lutetium fluoride (LuF$_3$) | 0.795 |
| Ytterbium fluoride (YbF$_3$) | 0.19 |
| Holmium fluoride (HoF$_3$) | 0.015 | and further 0.14 mole of anhydrous zinc fluoride (ZnF$_2$) were added to the mixture. The resulting mixture was well blended by employing a ball mill, charged into an alumina crucible and heated at 1000° C. for 2 hours in a current of pure nitrogen in an electric furnace to obtain a phosphor for infrared-to-visible conversion which exhibited a green emission of a high brightness under excitation of infrared radiation.

EXAMPLE 17

To one mole of anhydrous complex rare earth fluorides prepared by an optional known method or the above-mentioned method, having a composition expressed by the formula (Lu$_{0.79}$·Yb$_{0.19}$·Er$_{0.02}$)F$_3$ 0.3 mole of zinc silicofluoride (ZnSiF$_6$·6H$_2$O) was added. The resulting mixture was well blended by employing a mortar, charged into a platinum crucible and heated at 1000° C. for 2 hours in a current of anhydrous hydrogen fluoride followed by washing with hydrochloric acid of the same amount as that of the product. Thus there was obtained a phosphor for infrared-to-visible conversion which emitted at a high efficiency under excitation of infrared radiation and exhibited the emission spectrum shown in curve $a$ of FIG. 6.

What we claim is:

1. A process for the preparation of a zinc-incorporated phosphor for infrared-to-visible conversion, which comprises adding zinc fluoride in an amount of at least 2% by weight or zinc silicofluoride in an amount of at least 10% by weight based on the total weight of the anhydrous rare earth fluorides shown by the general composition hereafter, prior to or after formation of the main ingredient of the phosphor consisting essentially of a complex rare earth fluoride having a general composition expressed by one of the following formulae $$(Y_{1-x-y}Yb_xA_y)F_3, (La_{1-x-y}Yb_xA_y)F_3$$

and $(Lu_{1-x-y}Yb_xA_y)F_3$, wherein $x$ is in the range from 0.05 to 0.5, $y$ is in the range from 0.002 to 0.09 when yttrium fluoride is the host material and from 0.001 to 0.1 when lanthanum or lutetium fluoride is the host material, and A is at least one member selected from Er and Ho, and subsequent heating at a temperature ranging from 800 to 1200° C. for a time of 30 minutes to 5 hours in a neutral or anhydrous hydrogen fluoride atmosphere.

2. The process for the preparation of a zinc-incorporated phosphor for infrared-to-visible conversion in accordance with claim 1, wherein zinc fluoride is added in an amount of 10–15% by weight based on the total weight of the anhydrous rare earth fluorides shown by the general composition.

3. The process for the preparation of a zinc-incorporated phosphor for infrared-to-visible conversion in accordance with claim 1, wherein zinc silicofluoride is added in an amount of 20–30% by weight based on the total weight of the anhydrous rare earth fluorides shown by the general composition.

4. The process for the preparation of a zinc-incorporated phosphor for infrared-to-visible conversion in accordance with claim 1, wherein the complex rare earths fluoride included as a main ingredient has a general composition expressed by $(La_{1-x-y}Yb_xA_y)F_3$ wherein $x$, $y$ and A are as defined in claim 1 and heating is carried out at a temperature about 1050° C. for a time of from 1 to 3 hours.

5. The process for the preparation of a zinc-incorporated phosphor for infrared-to-visible conversion in accordance with claim 1, wherein the complex rare earths fluoride included as a main ingredient has a general composition expressed by $(Y_{1-x-y}Yb_xY_y)F_3$ or $(Lu_{1-x-y}Yb_xA_y)F_3$ wherein $x$, $y$ and A are as defined in claim 1 and heating is carried out at a temperature about 1000° C. for a time of from 1 to 3 hours.

6. The process in accordance with claim 1, wherein said neutral atmosphere is nitrogen or argon.

7. The process in accordance with claim 1, wherein the phosphor is washed with acid after heating.

8. The process in accordance with claim 7, wherein said acid is nitric acid or hydrochloric acid.

References Cited

UNITED STATES PATENTS

| | | | |
|---|---|---|---|
| 3,541,018 | 11/1970 | Hewes et al. | 252—301.4 R |
| 3,667,921 | 6/1972 | Grodkiewicz | 252—301.4 R |
| 3,294,701 | 12/1966 | Vogel et al. | 252—301.6 R |
| 2,806,002 | 9/1957 | Smith | 252—301.6 R |

FOREIGN PATENTS

| | | | |
|---|---|---|---|
| 268,574 | 7/1970 | U.S.S.R. | 252—301.6 R |

OSCAR R. VERTIZ, Primary Examiner

J. COOPER, Assistant Examiner

U.S. Cl. X.R.

252—301.4 H